US006543228B2

(12) United States Patent
Deacon

(10) Patent No.: US 6,543,228 B2
(45) Date of Patent: Apr. 8, 2003

(54) TURBOCHARGER HAVING BY-PASS VALVE OPERABLE TO PROMOTE RAPID CATALYTIC CONVERTER LIGHT OFF

(75) Inventor: Edwin Richard Deacon, Merseyside (GB)

(73) Assignee: BorgWarner, Troy, MI (US)

( * ) Notice: Subject to any disclaimer, the term of this patent is extended or adjusted under 35 U.S.C. 154(b) by 0 days.

(21) Appl. No.: 09/976,976

(22) Filed: Oct. 12, 2001

(65) Prior Publication Data

US 2002/0050138 A1 May 2, 2002

(51) Int. Cl.[7] .............................................. F02D 23/00
(52) U.S. Cl. ........................... 60/602; 415/30; 137/527
(58) Field of Search ............................ 60/602; 415/30, 415/144, 157, 158; 137/527, 892, 614, 614.06; 251/308

(56) References Cited

U.S. PATENT DOCUMENTS

| | | | | |
|---|---|---|---|---|
| 4,098,085 A | * | 7/1978 | McDowell | 60/602 |
| 4,244,187 A | | 1/1981 | Lane et al. | |
| 4,437,311 A | | 3/1984 | Iwamoto et al. | |
| 4,492,519 A | * | 1/1985 | Owen et al. | 60/602 |
| 4,660,382 A | | 4/1987 | Ueno et al. | |
| 4,745,752 A | * | 5/1988 | Suzuki | 60/602 |
| 4,893,474 A | | 1/1990 | Miller et al. | |
| 5,079,921 A | * | 1/1992 | McCandless et al. | 60/602 |
| 5,146,752 A | | 9/1992 | Bruestle | |
| 5,148,678 A | * | 9/1992 | Ueda et al. | 60/602 |
| 5,943,864 A | * | 8/1999 | Sumser et al. | 60/602 |
| 6,089,019 A | * | 7/2000 | Roby et al. | 60/602 |

FOREIGN PATENT DOCUMENTS

| | | | | |
|---|---|---|---|---|
| JP | 358048716 A | * | 3/1983 | 415/30 |
| JP | 410103531 A | * | 4/1998 | |

* cited by examiner

Primary Examiner—Thomas Denion
Assistant Examiner—Thai-Ba Trieu
(74) Attorney, Agent, or Firm—Pendorf & Cutliff; Greg Dziegielewski

(57) ABSTRACT

A turbocharger assembly has a housing (1) in which is formed a turbine volute inlet duct (4) having a butterfly valve (8) disposed therein and a bypass duct (6) which contains a swing valve (15), the valves being operable to control the flow of exhaust gas through each duct. A link member (30) is mounted for rotation about the pivot axis (21) of the swing valve (15) and has an opening in which an actuating pin (20) engages with a tolerance fit so as to non-rotatably connect the swing valve (15) to the link plate (30). The link plate also has an elongated channel (34) along which an actuating pin (13) of the butterfly valve travels upon rotation of the link plate (30) about the pivot axis (21). The elongated channel has a first portion (34a) which extends along an arc centred on the axis of rotation (21) and a second portion (34b) which extends along an arc whose centre is offset from said axis (21). In this way, during a first range of movement of the link plate (30) the actuating pin (13) of the butterfly valve moves along the first portion (34a) and no operative movement of the valve (8) is effected, whilst during a second range of movement of the link plate (30), a camming action is applied to the actuating pin (13) causing it to rotate about the axis of the butterfly valve (8) and close it. The link plate (30) is thereby able to provide normal wastegate relief to the turbocharger during the first range of movement by operation of the swing valve only, and is also able to provide cold start bypass of the turbocharger in the second range of movement, during which the butterfly valve (8) is closed and the swing valve (15) fully opened so that all the exhaust gas bypasses the turbocharger and reaches the catalytic converter with minimum heat loss. Rapid light-off of the catalytic converter during cold start conditions is thereby ensured.

13 Claims, 5 Drawing Sheets

TURBOCHARGER HAVING BY-PASS VALVE OPERABLE TO PROMOTE RAPID CATALYTIC CONVERTER LIGHT OFF

BACKGROUND OF THE INVENTION

1. Field of the Invention

The present invention relates to turbochargers having valves operable to cause the exhaust gases to by-pass the turbocharger.

2. Description of the Related Art

It is known in the field of internal combustion engines that catalytic converters, which are extensively used in the automobile industry to reduce engine emissions, operate with significantly reduced efficiency during cold start and engine warm-up conditions, resulting in higher than normal exhaust emissions during these periods. It is therefore recognised that thermal inertia within the exhaust system of such an engine should be kept to a minimum during cold start conditions in order to maximise the heat delivered to the catalytic converter from the engine, thereby promoting light off of the catalyst and so minimising the time during which emissions are at an unacceptable level.

Turbochargers are now commonly used to increase the power delivered by an engine by utilising the waste energy of the exhaust gases to power a turbine which compresses the intake air delivered to the combustion chamber. However, the provision of a turbocharger in the exhaust system of the engine imposes extra thermal inertia on the system, which delays catalytic converter light off in such engines and so increasing the time during which engine emissions exceed an acceptable level. In order to overcome this problem, turbochargers have been developed which have two separate ducts at the turbine inlet flange, one duct directing the exhaust gas to the turbine volute and the other providing a bypass for the turbine volute. A valve is provided in each duct to control the flow of exhaust gases therethrough. During normal engine operating conditions, the valve in the turbine volute duct is fully open, allowing exhaust gas to power the turbocharger, whilst the valve in the bypass duct operates to vary the through-flow in the bypass duct so as to provide standard wastegate control of the pressure in the turbine volute in order to prevent over-pressuring. During cold start conditions, however, the turbine volute valve is closed and the bypass valve opened so that the exhaust gases bypass the turbine and are instead directed to the catalytic converter with minimum heat loss, thereby promoting rapid light-off of the catalyst. Conventional such systems have the problem, however, that they require two separate actuators, one for each valve, due to the different range and sequence of movement required for each valve, and this increases the complexity and hence cost of the turbocharger system as well as increasing its overall size.

There is hence a need for a turbocharger which includes a system to enable exhaust gases to bypass the turbine during cold start conditions and instead to be fed to the catalyst with minimal heat loss so as to promote catalytic converter light-off, whilst being of reduced size and complexity as compared with existing turbochargers.

SUMMARY OF THE INVENTION

According to the present invention, there is provided a turbocharger assembly comprising a turbine bypass duct having a first valve disposed therein, and a turbine feed duct having a second valve disposed therein, characterised in that the first and second valves are coupled to a link member, the first valve being operatively attached to said link member so as to be constrained for movement therewith throughout the full range of operative movement of the link member, and the second valve having a lost motion coupling with the link member so as to be constrained for movement therewith through only a part of the full range of operative movement of the link member, wherein upon movement of said link member between a start position and an intermediate position, operative movement of the first valve only is effected and upon movement of the link member between said intermediate position and an end position, operative movement of the first and second valves occurs.

A turbocharger assembly in accordance with the invention has the advantage that it requires just a single actuator to control the valves in the turbine feed and turbine bypass ducts so as to provide wastegate operation during normal operating conditions of the turbocharger in order to prevent over-pressuring, as well as exhaust gas bypass of the turbine during cold start conditions in order to promote rapid catalytic converter light-off using, thereby reducing cost. It also has the advantage that the system is much more compact since space is required for just a single actuator.

In a preferred embodiment of the invention, the lost motion coupling between the second valve and the link member is effected by means of an elongated channel formed in the link member in which an actuating pin of the second valve engages. During movement of the link member between its start position and the intermediate position, the actuating pin of the second valve travels along the channel without moving relative to the turbine volute inlet duct, and upon movement of the link member from its intermediate position to its end position, the actuating pin moves with the link member through engagement with a surface of the channel, moving the actuating pin relative to the turbine volute inlet duct and hence closing the second valve.

The elongated channel is advantageously formed with two distinct sections, a first section along which the actuating pin of the second valve moves upon movement of the link member between the start position and the intermediate position, and a second section which imparts a camming action to the actuating member of the second valve as it moves therealong upon movement of the link member between said intermediate position and the end position. By suitable choice of the shape of the first and second sections, not only can movement of the second valve be eliminated during movement of the link member between said start position and said intermediate position, but also the speed and sensitivity of the movement of the second valve during movement of the link member between said intermediate and end positions can also be controlled.

In one embodiment of the invention, the link member is mounted for pivotal movement in the turbocharger assembly and the second valve is a rotary valve. The elongated channel is then formed such that the first section subtends an arc centred on the axis of rotation of the link member and the second section subtends an arc centred on a point offset from the axis of rotation of the link member, the offset of the centre of the arc of the second section from the axis of rotation of the link member and the radius of curvature of the second arc being used to vary the sensitivity of the second valve to the movement of the link member and hence the range of angular movement of the link member. It is particularly advantageous if the second valve takes the form of a butterfly valve having an actuating pin offset from the axis of rotation of the valve such that movement of the actuating member about the axis of the valve effects operative movement of the valve between an open and a closed position. Since butterfly valves are essentially balanced devices, they only required a relatively small amount of torque for full range movement and power consumption for operation of the turbocharger assembly is therefore reduced. The link member may alternatively be mounted for translational movement.

Preferably the valves are aerodynamically balanced, that is the gas forces developed on the valves are balanced, for example are disposed equally on either side of the pivot axis in a rotary valve or do not have a resultant component in the slide direction in the case of slide valves. In this way, the forces required to operate the valves are kept small and, more importantly, relatively constant during operation, which has the advantage of reducing the power requirements of an actuator utilised to operate the link member.

The first and second valves are preferably realised as rotary valves whose axes are parallel to each other, the first valve being a swing valve and the second valve a butterfly valve. However, other valves such as barrel valves, ball valves, slide valves, as well as different combinations thereof, are also possible within the scope of the invention, it merely being necessary that the elongated channel be configured so that no movement of the second valve occurs during the first range of movement of the link member whether it be configured for translational or rotational motion, and the appropriate camming action is applied to the actuating member of the second valve to effect operative movement of the second valve between its open and closed positions during the second range of movement of the link member.

In the preferred embodiment, the first valve is a swing valve having a pivot axis about which the link member is mounted for rotation. The swing valve can then be coupled to the movement of the link member very easily by means of an actuating pin attached to the swing valve in a position offset from the pivot axis which engages in a complementary shaped opening in the link member. This has the advantage of simplifying the design of the link member. Alternatively, the axis of the rotation of the link member may be offset from that of the swing valve, in which case the link member has a second elongated channel in which the actuating pin of the first valve engages. Furthermore, by appropriate shaping of the second elongated channel, the link member may be mounted for rotational movement and the first valve may be a slide valve, or the first valve may be a rotary valve and the link member mounted for translation movement.

Preferably, when the link member is in the start position the first valve is closed and the second valve is open. In this way, all exhaust gas from the engine is directed through the turbine in order to maximise the boost pressure of the turbocharger. In the second position the second valve remains fully open and the first valve is partially open so as to allow a portion of the exhaust gas to bypass the turbine. During conditions when the catalytic converter is at its normal operating temperature, the link member will then move from the start position towards the intermediate positions as the engine speed increases and vice versa so as to prevent over pressuring in the turbocharger. In the end position of the link member, the first valve is at its extreme open position whilst the second valve is closed so that all the exhaust gas bypasses the turbine and instead passes directly into the exhaust system and to the catalytic converter. In this way, during cold start conditions the exhaust gas reaches the catalytic converter with minimal heat loss, thereby ensuring that the catalyst reaches it operating temperature in the shortest possible time.

Preferably, when the second valve is in its closed position, a small amount of leakage of exhaust gas past the second valve to the turbine volute still takes occurs. This may be achieved by the second valve not being in a fully closed position when the link member is at its end position or by designing the valve plate of the second valve to permit a small amount of leakage, such by including through openings therein or by making the plate slightly smaller than the cross-sectional dimensions of the turbine volute inlet duct in which it is located. For example, the valve may be a barrel valve having a main through opening which is aligned with the axis of the turbine volute duct when the valve is open to allow gas to pass therethrough as well as a through-opening at right angles thereto which is aligned with the axis if the duct when the valve is closed so as to allow a controlled degree leakage of gas to the turbine. In this way, the turbine will continue to spin, albeit slowly, even when the link member is in its end position, this having the advantage that it helps to prevent turbine seal oil leakage which is known to occur when a pressurised oil supply feeds a non-rotating turbocharger within a vibrating environment and which increases exhaust emissions. It also has the advantage that it helps to prevent bearing damage which can occur in a turbocharger which is constrained from rotation after repeated cyclic vibration. The rate of leakage can also be set as required, for example by varying the size of the hole, to set the desired "tickover" for the turbine.

BRIEF DESCRIPTION OF THE DRAWING

In order that the invention may be well understood, there will now be described some embodiments thereof, given by way of example, reference being made to the accompanying drawings, in which.

DETAILED DESCRIPTION OF THE INVENTION

Figure 1:
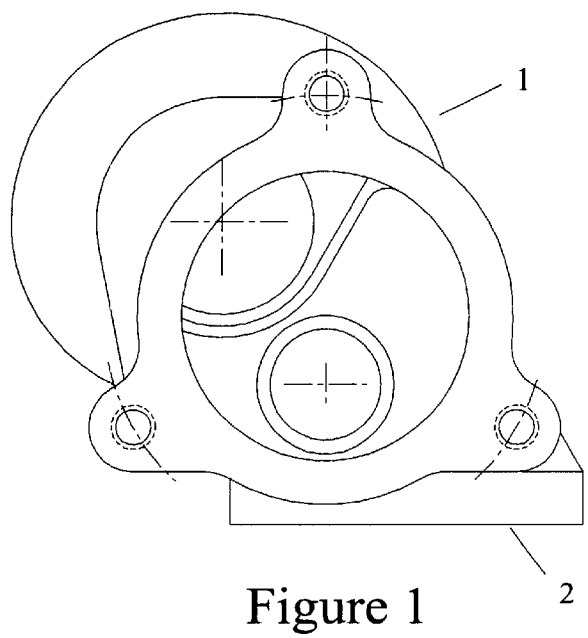
FIG. 1 is an end view of a housing of a turbocharger according to the invention.
Figure 2:
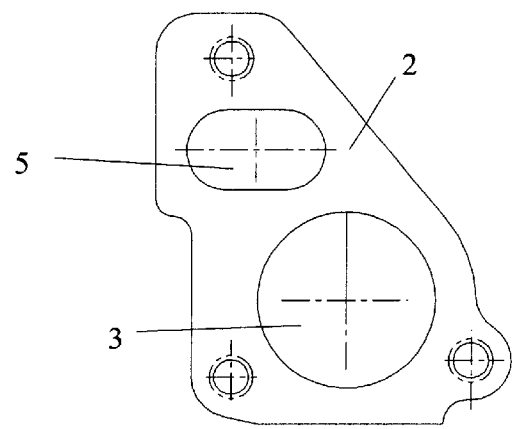
FIG. 2 is a bottom view of the inlet flange of the turbocharger housing of FIG. 1 showing separate turbine inlet and turbine bypass ports.
Figure 3:
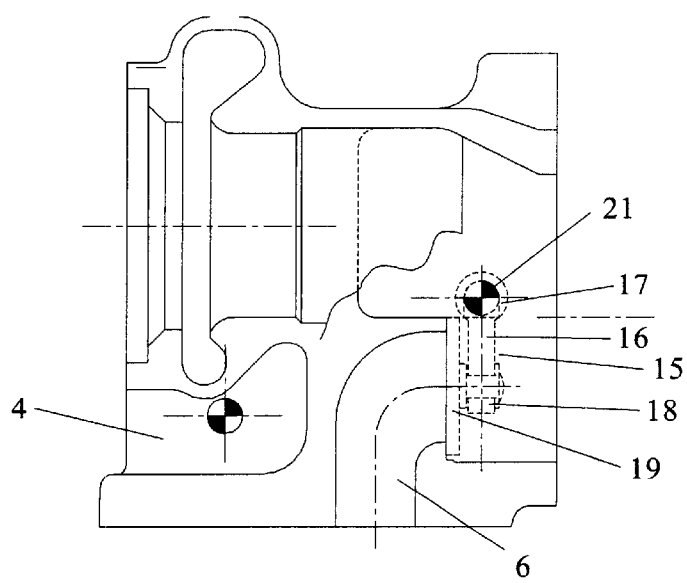
FIG. 3 is a sectional side view of FIG. 1 showing the positions of first and second valves disposed in the turbocharger.

Referring first to FIG. 1, there is shown an end view of a turbocharger housing 1 having a turbine inlet flange 2 which, in use, is connected to an exhaust manifold casing of an internal combustion engine (not shown). The turbine inlet flange 2 is provided with a two inlet ports—a turbine volute inlet port 3 which represents the entrance to a turbine volute inlet duct 4 by means of which exhaust gases may be fed to the turbine (not shown) of the turbocharger, and a turbine bypass port 5 which represents the entrance to a combined wastegate and bypass warm-up duct 6 by means of which the exhaust gases may bypass the turbine and instead be delivered directly into the exhaust system (not shown) so as to prevent over pressuring in the turbocharger or to ensure that the exhaust gases reach a catalytic converter (not shown) with minimum heat loss as discussed below.

Figure 4:
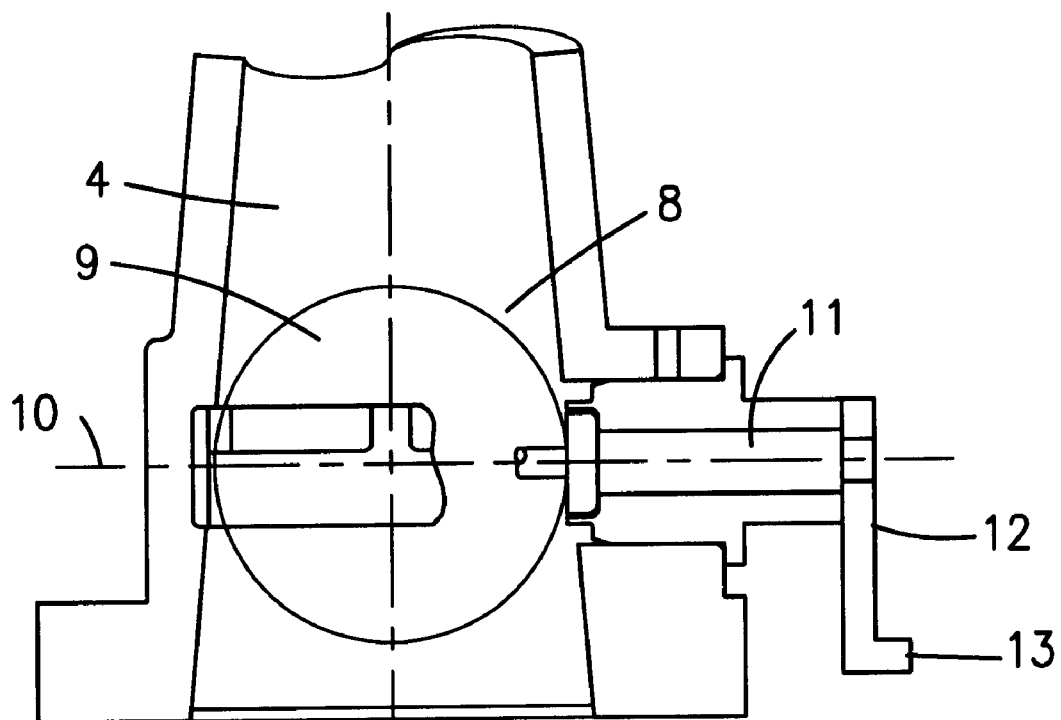
FIG. 4 is a schematic side view of part in a turbine feed duct of the turbocharger having a butterfly disposed therein.
Figure 5:
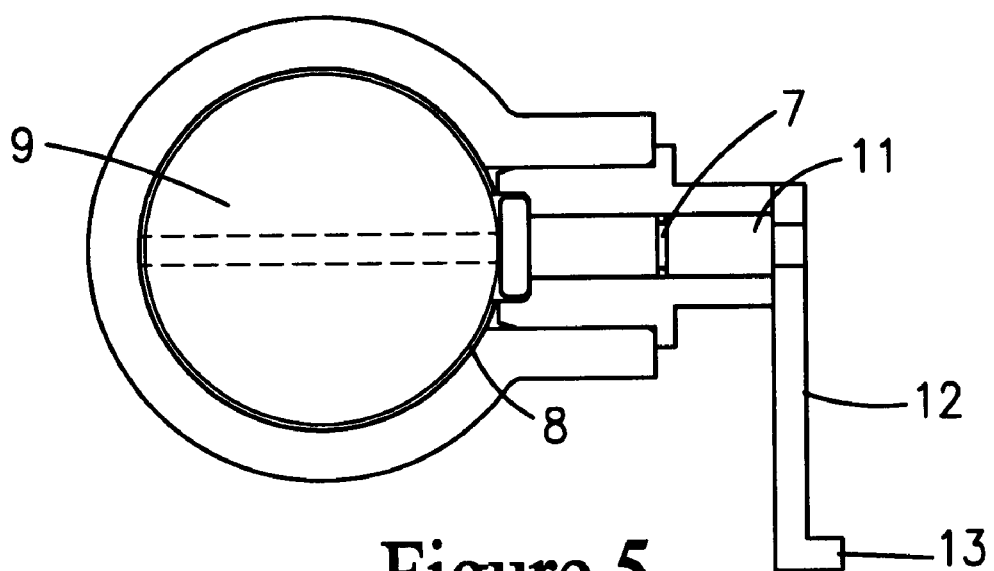
FIG. 5 is an end view of the butterfly valve of FIG. 4.

Disposed in the turbine volute duct 4 between the inlet port 3 and the turbine is a butterfly valve assembly 8 illustrated in detail in FIGS. 4 and 5. The butterfly valve 8 has a valve plate 9 of complementary shape and size to the internal cross section of the volute duct 4 in which it is mounted. The valve plate 9 is mounted in the duct for pivotal movement about its centre line 10 between a first position, shown in phantom in FIG. 4, in which the plane of the plate 9 is aligned with the axis of the duct 4 so as to allow passage of exhaust gases to the turbine, and a second position, shown in FIG. 5, in which the plane of the plate 9 is perpendicular to the axis of the duct 4 so as substantially to close the duct 4 to the passage of exhaust gases. Stops (not shown) may be provided, either internally or externally of the duct 4, to limit the range of movement of the valve plate 9.

The butterfly valve assembly 8 also has an actuating shaft 11 which extends from the valve plate 9 along the centre line 10 and non-rotatably attached to the end of which is a rotator arm 12. The rotator arm 12 extends radially from the shaft 11 and provides a lever arm by means of which the valve plate 9 may be rotated between its open and closed positions. On the end of the rotator arm 12 remote from the shaft 11 is an actuating pin 13 which extends at right angles to the arm 12 parallel to the shaft 11 and away from the valve plate 9, and on which is carried a roller 14 (FIG. 7) which acts as a cam follower as described below. The butterfly valve assembly 8 may be fabricated as a unitary casting, or may alternatively be made from a nimonic or inconel disc, preferably fine blanked, which is welded to a separate arm. A piston seal ring (FIG. 5) may also be provided around the shaft 11 in order to reduce leakage of exhaust gas from the turbine volute duct 4 to atmosphere. It is also advantageous for the height of the butterfly valve centre line above the inlet flange surface to be kept as short as possible to facilitate assembly of the turbocharger system.

The turbine volute bypass duct 6 similarly includes a valve which, in the illustrated embodiment, takes in the form of a swing valve assembly for controlling the flow of exhaust gases therethrough. The swing valve assembly 15, which is of conventional design, comprises a rotator arm 16 mounted at one end 17 for pivotal movement about an axis 21 which is parallel to the centre line 10 of the butterfly valve 8. On the other end 18 of the rotator arm 16 is carried a valve plate 19 of complementary shape and size to the cross-section of the portion of the by-pass duct 6 in which it is mounted. The swing valve 15 also includes an actuating pin 20 (see FIGS. 7 to 9) which extends perpendicularly from the rotation arm proximate to the valve plate 19 and by means of which operative movement of the valve plate 19 between a closed position (shown in FIG. 7) and an open position (shown in FIG. 9) may be effected.

Actuation of the butterfly valve 8 and the swing valve 15 is effected through movement of a link plate 30, shown in FIGS. 5, which is configured for rotation about an axis 31 which is aligned with the pivot axis 21 of the swing valve assembly 15. In the illustrated embodiment, the link plate has a circular opening 32 by means of which it may be mounted on a pivot shaft (not shown) of the swing valve assembly but the skilled reader will understand that other mounting systems are also possible. Formed in the link plate 30 offset from the circular opening 32 is a first recess 33, which in the illustrated embodiment takes the form of a hole, for receiving the actuating pin 20 of the swing valve assembly 15 so as to non-rotatably couple the link plate 30 to the rotator arm 16 throughout the full range of movement of the link plate 30.

Figure 6:
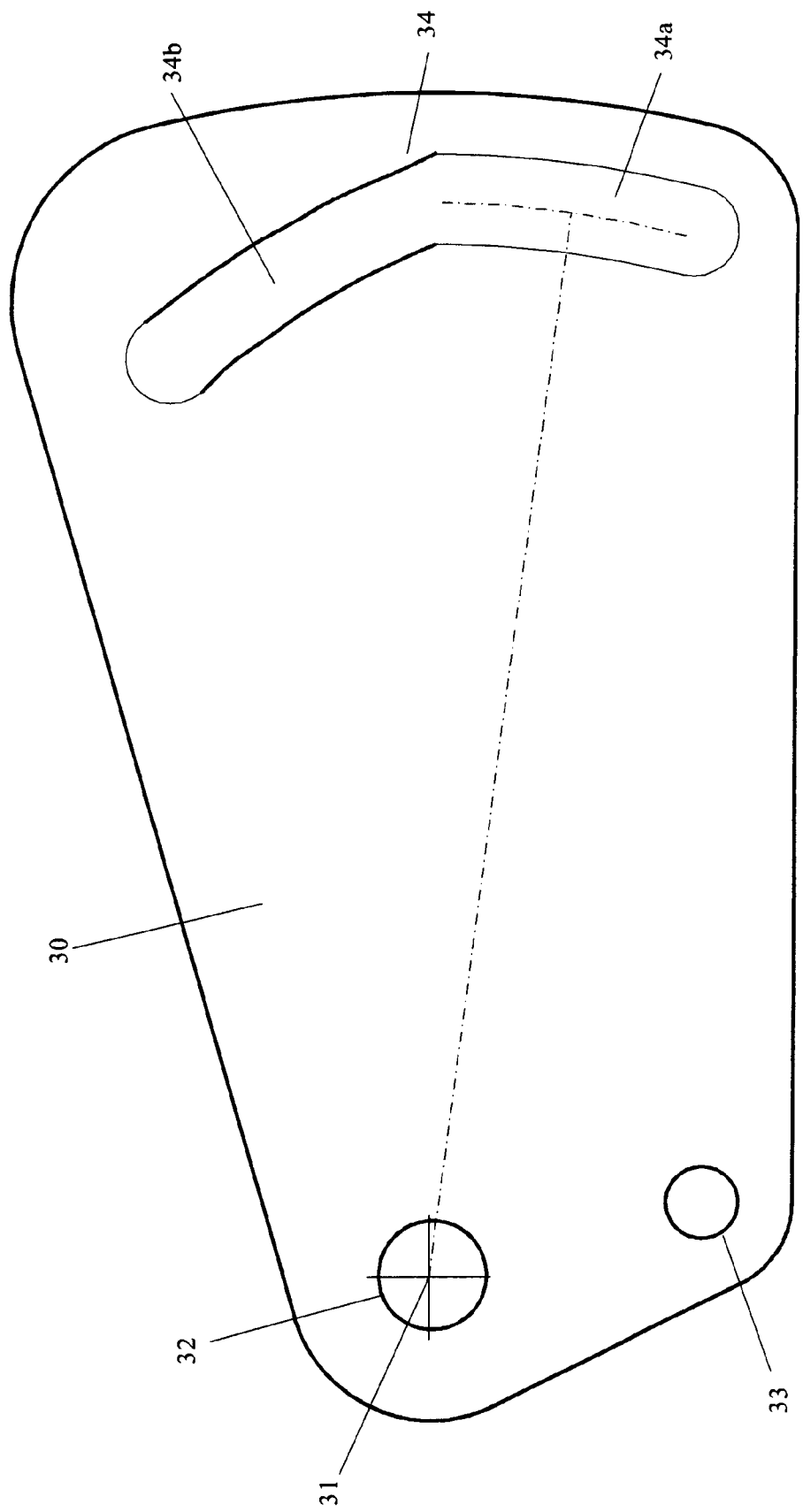
FIG. 6 is a top view of a link plate of the invention.
Figure 7:
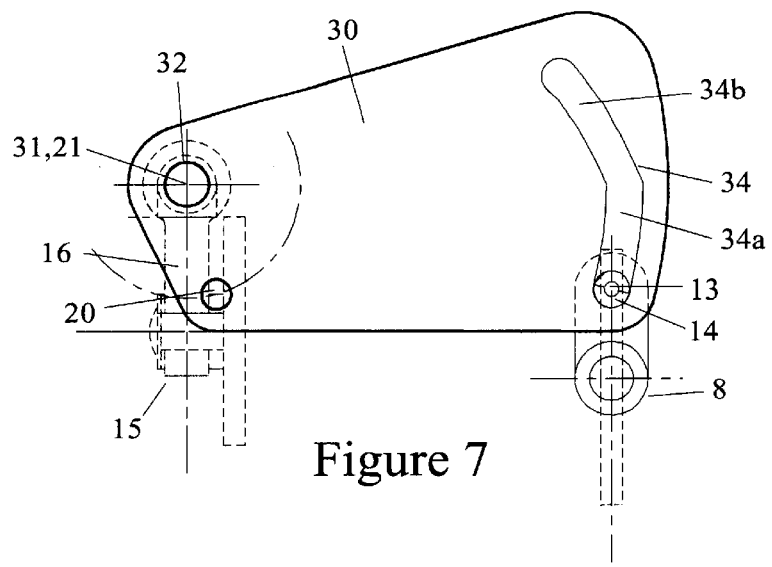
FIG. 7 is a schematic top view of the link member of FIG. 6 in a first position in which said first valve is closed and the second valve is fully open.
Figure 8:
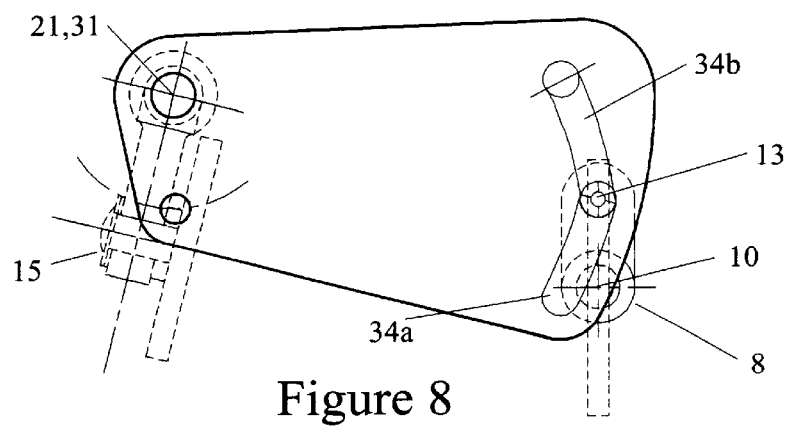
FIG. 8 is a top view of the link member in a second position in which the first valve is partially open and the second valve is fully open.
Figure 9:
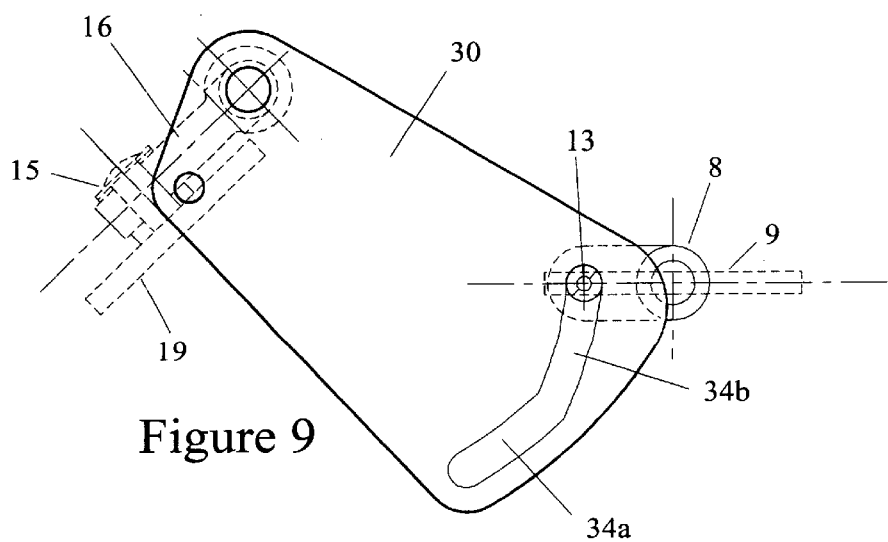
FIG. 9 is a top view of the link member in a third position in which the first valve is in an extra open position and the second valve is fully closed.

The link plate 30 also includes a second recess in the form of an elongated channel 34 in which is received the roller 14 of the actuating pin 13 of the butterfly valve assembly as shown in FIGS. 7 to 9. The channel 34 has two distinct sections as shown in FIG. 6—a first section 34a which defines an arc centred on the axis of rotation 31 of the link plate 30, and a second section 34b which extends along an arc whose centre is offset from the axis 31 of the link plate 30, so that as the roller 14 moves along the first section 34a, no motion is imparted to the plate 9 of the butterfly valve 8 but as it moves along the second section 34b, a camming action occurs which causes the pin 14 to rotate about the centre line 10 of the valve 8, closing the valve 8.

The butterfly and swing valves 8,15 operate as follows: During normal engine operating conditions in which the catalytic converter is at operating temperature, the link plate 30 moves between a first position shown in FIG. 7 and a second position shown in FIG. 8. In the first position, which represents the operating position of the link plate 30 when the engine is operating at a low or intermediate speed, the butterfly valve 8 is fully open and the swing valve 15, which operates as a wastegate valve, is fully closed. This results in all the exhaust gas leaving the exhaust manifold being directed to pass through the turbine of the turbocharger and hence ensures maximum boost from the turbocharger.

As the engine speed increases, so to does the speed of the exhaust gases entering the turbocharger inlet manifold, resulting in an increase in the boost pressure of the turbocharger. When the boost produced by the turbocharger which can be measured by monitoring of the engine speed, the pressure of the exhaust gas in the turbine inlet duct 4, the pressure of the air delivered to the combustion chamber, etc. reaches a predefined level, the swing valve 15 is progressively opened to an intermediate position shown in phantom in FIG. 8, by pivoting the link plate 30 about its pivot axis 31, using a suitable actuator (not shown), from its first position (FIG. 7) to its second position (FIG. 8). Throughout this range of movement, the butterfly valve 8 remains fully open due to the profile of the first section 34a of the elongated channel 34 along which the roller 14 travels. In this way, a portion of the exhaust gas entering the turbocharger housing is able to bypass the turbine, thereby limiting the maximum boost delivered by the turbocharger so as to prevent over-pressuring of the air delivered to the combustion chamber of the engine. In this way, provides standard wastegate functions for the turbocharger can be effected.

On cold start conditions in the engine, i.e. when the catalytic converter is below its normal operating temperature, the link plate 30 is moved by the actuator beyond the second position shown in FIG. 8 to a third position shown in FIG. 9. As the link plate 30 pivots about the axis 21 beyond the second position, the swing valve moves from its partially open position (shown in phantom in FIG. 8) to an extreme open position (shown in phantom in FIG. 9). At the same time, roller 14 of the butterfly valve assembly 8 enters the second section 34b of the elongated channel 34, and as it travels therealong, the camming action which arises due to the centre of curvature of the arcuate second section 34b being offset from the pivotal axis 31 of the link plate 30 causing the actuating pin 13 to rotate about the axis 10 of the butterfly valve assembly 8, thereby closing the butterfly valve. In this way, the exhaust gas is prevented from reaching the turbine and is instead directed along the bypass duct 6 and fed to the catalytic converter with minimum heat loss. This promotes rapid catalytic converter light-off and minimises the period during which exhaust emission exceed acceptable levels.

It will, of course, be understood that the cam profile of the second section 34b of the elongated channel 34 can be varied to offer an almost infinite combination of actuator stroke length and relative valve position. The length of the arcs subtended by the sections of the elongated channel 34 may also be extended from those illustrated in FIGS. 6 to 9 in order to accommodate component and assembly build tolerance stack up.

Since a butterfly valve is essentially a balanced device, the actuator power required to effect operative movement of the link plate 30 is similar to that required for operation of the wastegate of a conventional turbocharger of similar size. The actuator is advantageously electrically powered since it can then be integrated with and controlled by a computerised engine management system. However, it will be understood that other types of actuator are also possible. For example, a pneumatic actuator might be advantageous in a vehicle which already has a vacuum pump installed for powering a steering or braking assistance system.

In a variation to the illustrated embodiment, instead of being fixed to the rotator arm 12 of the butterfly valve assembly 8, the actuating pin 13 may be mounted for sliding movement along the rotator arm 12. In this way, the first 34a and second 34b sections of the elongated slot 34 in the link plate 30 may be straight instead of arcuate, movement of the actuating pin 13 along the rotator arm 12 providing a further lost motion coupling in the parallel to the plane of the valve plate 9 of the butterfly valve assembly 8. As a result, the required pivotal movement of valve plate 9 about its centre line 10 can still be produced through pivotal movement of the link plate 30 about the axis 21.

Figure 10:
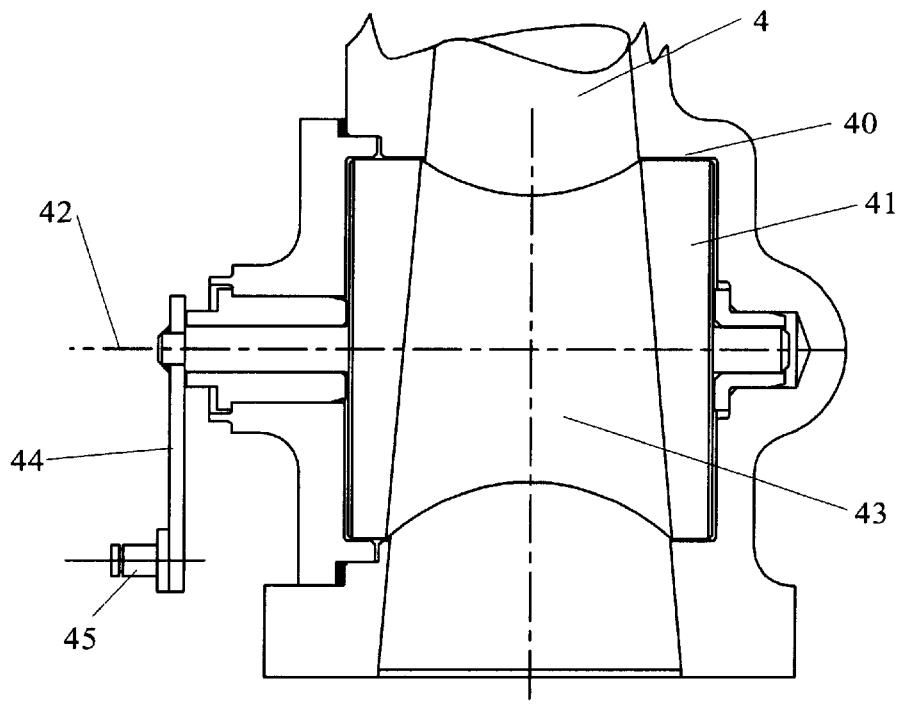
FIG. 10 is a sectioned side view of a barrel valve which may be used in place of the butterfly valve of FIGS. 4 and 5.
Figure 11:
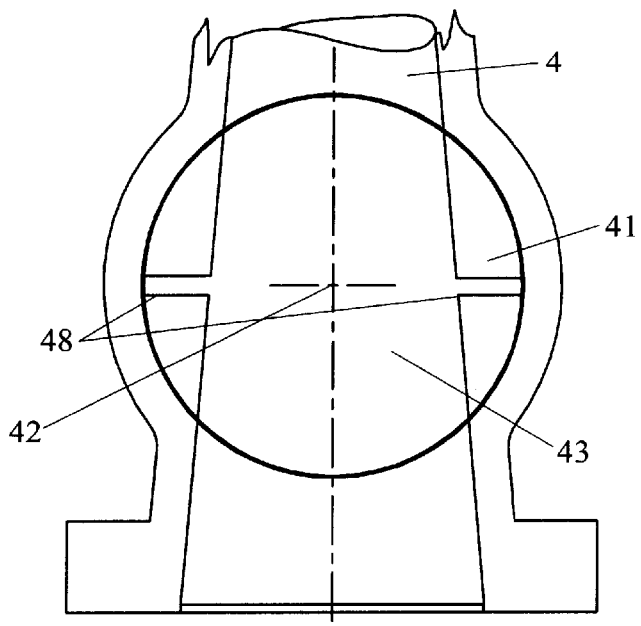
FIG. 11 is a sectioned end view of the valve of FIG. 10.

The butterfly and swing valves in the above described embodiment may also be replaced by other types and combinations of valves. For example, both the turbine volute inlet duct 4 and the turbine bypass duct 6 could include the same type of valve which might be a butterfly valve, a swing valve or some other type of rotating valve such as a ball valve or a barrel valve (40) as shown in FIGS. 9 and 10.

The barrel valve 40 operates in a similar fashion to the butterfly valve 8 but the valve plate 9 is replaced by a valve barrel 41 which is mounted in the duct 4 for rotation about the axis 42 and which has a through-opening 43 extending at right angle to the axis 42. Through the rotation arm 44 and activation pin 45, the valve barrel 41 may be rotated about the axis 42 between an open portion in which the longitudinal axis 46 of the through-opening 43 is aligned with the axis of the inlet 4 and a closed portion in which the longitudinal axis 46 of the through opening is perpendicular to the axis of the inlet. The through-opening 43 is advantageously shaped, for example tapered, to complement the shape (taper) of the duct 4 in order to avoid undesirable aerodynamic forces arising. Preferably the valve barrel 41 also includes a second through opening 48 which is of much smaller dimension than the main opening 43 and is perpendicular to both the main through opening 48 and the axis 42 of the valve so as to be aligned with the axis of the duct 4 when the valve is closed. A small amount of exhaust gas is thereby able to pass the valve and reach the turbine even when it is closed so as to keep the turbine slowly spinning during warmup conditions. It will of course be understood that other ways may be utilised to allow a small leakage of exhaust gas past the "closed" turbine volute valve to the turbine both with the barrel valve arrangement and in embodiments which use other valve.

In another embodiment which is not illustrated, the valves are replaced by non-rotating valves such as slide valves. This may be achieved using a link plate which is mounted for pivotal movement and which has channels provided therein whose cam profiles are chosen to translate the pivotal movement of the link member to translational sliding movement of the valves plates as the link plate moves between its first, second and third positions. Alternatively, the link plate may be mounted for translational movement in the direction of operation of the slide valves instead of rotational movement. The slide valve in the bypass duct is then constrained to move with the link plate through the full range of movement thereof by means of an actuating pin on the slide valve which engages in a hole in the link plate. The slide valve in the turbine volute inlet duct similarly has an actuating pin which engages in an elongated slot extending in the direction of operative movement of the link plate. As the link plate moves from between a first position and a second position, the valve in the bypass duct moves with it from a closed position to a partially open position whilst the valve in the turbine volute inlet duct remains closed as the actuating pin moves back and forth between the ends of the elongated channel. If the link plate is moved beyond the second position to a third position, the actuating pin of the slide valve in the turbine volute inlet duct is engaged by an end of the elongated channel and moved in the direction of operation of the link plate, causing the valve to close. At the same time, the valve in the bypass duct continues to move with the link plate to an extreme open position. It will therefore be understood that the same modes of operation can be achieved as described above in relation FIGS. 7 to 9. Suitable biasing means such as a spring or the link may, though, be required in the valve in the turbine volute inlet duct in order to ensure that the valve returns to its fully open position when the link plate is moved back from the third position to the second position.

What is claimed is:

1. A turbocharger assembly comprising a turbine bypass duct (6) having a first valve (15) disposed therein, and a turbine feed duct (4) having a second valve (8) disposed therein, characterised in that the first (15) and second (8) valves are coupled to a link member (30), the first valve (15) being operatively attached to said link member (30) so as to be constrained for movement therewith throughout the full range of operative movement of the link member (30), and the second valve (8) having a lost motion coupling with the link member (30) so as to be constrained for movement therewith through only a part of the full range of operative movement of the link member (30), wherein upon movement of said link member (30) between a start position and an intermediate position, operative movement of the first valve (15) only is effected and upon movement of the link member between said intermediate position and an end position, operative movement of the first (15) and second (8) valves occurs.

2. The turbocharger assembly as claimed in claim 1, wherein an elongated channel (34) is formed in the link member in which an actuating member (13) of the second valve (8) engages in order to effect the lost motion coupling between the second valve (8) and the link member (30).

3. The turbocharger assembly as claimed in claim 2, wherein the channel (34) has a first portion (34a) along which the actuating member (13) of the second valve (8) moves upon movement of the link member (30) between said start position and said intermediate position, and a second portion (34b) along which the actuating member (13) of the second valve (8) moves upon movement of the link member (30) between said intermediate position and said end position, said second portion (34b) being shaped to impart a camming action to the actuating member as it travels therealong.

4. The turbocharger assembly according to claim 3, wherein the link member (30) is mounted for rotational movement.

5. The turbocharger assembly according to claim 4, wherein said second valve is a rotary valve (8) having a rotator arm (12) on which is carried the actuating member (13) offset from the axis of rotation of the valve (8), the first portion (34a) of the elongated channel (34) subtends an arc centred on the axis of rotation (31) of the link member (30), and the second portion (34b) subtends an arc centred on a point which is offset from the axis of rotation (31) of the link member (30).

6. The turbocharger assembly according to claim 5, wherein the second valve is a butterfly valve.

7. The turbocharger assembly according to claim 4, wherein the first valve is a rotary valve (15) having an actuating member (20) which engages in an opening (33) in the link member (30) such that movement of the first valve (15) is coupled to movement of the link member (30).

8. The turbocharger assembly according to claim 7, wherein the axis of the first valve is parallel to the axis of the second valve.

9. The turbocharger assembly according to claim 7, wherein the first valve (15) is a swing valve whose axis of rotation (21) is aligned with the axis of rotation (31) of the link member (30).

10. The turbocharger assembly according to claim 9, wherein the link member (30) and the swing valve (15) are mounted for rotation on a common shaft.

11. The turbocharger assembly according to claim 1, wherein at least one of the first and second valves is an aerodynamically balanced valve.

12. The turbocharger assembly according to claim 1, wherein in the start position of the link member the first valve is closed and the second valve is fully open, upon movement of the link member between said start position and said intermediate position the first valve moves between a closed position and a partially open position whilst the second valve remains open, thereby providing wastegate pressure relief to the turbocharger, and upon movement of the link member between said intermediate position and said end position, the first valve moves between said partially open position and an extreme open position whilst the second valve moves between and open position and a closed position.

13. The turbocharger assembly according to claim 12, wherein the second valve is configured such that in its closed position gas leaks past said valve, whereby, in use, the turbine of the turbocharger is caused to spin at all times when the engine is running.

* * * * *